(12) United States Patent
Teraoka et al.

(10) Patent No.: US 10,943,734 B2
(45) Date of Patent: Mar. 9, 2021

(54) MULTILAYER CERAMIC CAPACITOR AND MANUFACTURING METHOD OF THE SAME

(71) Applicant: TAIYO YUDEN CO., LTD., Tokyo (JP)

(72) Inventors: Hideya Teraoka, Takasaki (JP); Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 31 days.

(21) Appl. No.: 16/274,065

(22) Filed: Feb. 12, 2019

(65) Prior Publication Data
US 2019/0259537 A1    Aug. 22, 2019

(30) Foreign Application Priority Data
Feb. 21, 2018  (JP) .............................. JP2018-028941

(51) Int. Cl.
*H01G 4/224* (2006.01)
*H01G 4/12* (2006.01)
*H01G 4/012* (2006.01)
*H01G 4/30* (2006.01)

(52) U.S. Cl.
CPC ........... *H01G 4/224* (2013.01); *H01G 4/1227* (2013.01); *H01G 4/1245* (2013.01); *H01G 4/012* (2013.01); *H01G 4/1236* (2013.01); *H01G 4/30* (2013.01)

(58) Field of Classification Search
CPC ................................ H01G 4/224; H01G 4/12
See application file for complete search history.

(56) References Cited

U.S. PATENT DOCUMENTS

| | | | |
|---|---|---|---|
| 2006/0285274 A1 | 12/2006 | Iwasaki et al. | |
| 2013/0319741 A1 | 12/2013 | Ahn et al. | |
| 2014/0083755 A1* | 3/2014 | Lee ........................ | H05K 1/181 174/260 |

FOREIGN PATENT DOCUMENTS

| | | | |
|---|---|---|---|
| JP | 2006339285 A | | 12/2006 |
| JP | 2013251522 A | | 12/2013 |
| JP | 2016015369 A | * | 1/2016 |

* cited by examiner

*Primary Examiner* — Eric W Thomas
(74) *Attorney, Agent, or Firm* — Law Office of Katsuhiro Arai (57) ABSTRACT

A multilayer ceramic capacitor includes: a multilayer structure in which dielectric layers and internal electrode layers are alternately stacked and are alternately exposed to two edge faces of the multilayer structure; and a first cover layer and a second cover layer that sandwich the multilayer structure, a main component of the first cover layer and the second cover layer being the same as that of the dielectric layers, wherein the first cover layer is thicker than the second cover layer, wherein a concentration of Mn of at least a part of the first cover layer is higher than a concentration of Mn of the dielectric layers in an effective capacity region in which a set of internal electrode layers exposed to a first edge face of the multilayer structure face with another set of internal electrode layers exposed to a second edge face of the multilayer structure.

9 Claims, 8 Drawing Sheets

MULTILAYER CERAMIC CAPACITOR AND MANUFACTURING METHOD OF THE SAME

CROSS-REFERENCE TO RELATED APPLICATION

This application is based upon and claims the benefit of priority of the prior Japanese Patent Application No. 2018-028941, filed on Feb. 21, 2018, the entire contents of which are incorporated herein by reference.

FIELD

A certain aspect of the present invention relates to a multilayer ceramic capacitor and a manufacturing method of a multilayer ceramic capacitor.

BACKGROUND

When an alternating voltage is applied to a multilayer ceramic capacitor mounted on a substrate, extension and contraction caused by electrostriction may occur in the multilayer ceramic capacitor. In this case, vibration caused by the extension and contraction is conducted to the substrate, and acoustic noise phenomenon may occur. As a method for suppressing the acoustic noise in the mounted multilayer ceramic capacitor, there is disclosed a technology in which the acoustic noise is suppressed by enlarging a thickness of a lower cover layer (on the side of the substrate) more than a thickness of an upper cover layer (for example, see Japanese Patent Application Publication No. 2013-251522).

SUMMARY OF THE INVENTION

A densifying start temperature of the cover layer tends to be higher than that of an effective capacity region. This is because contraction of an internal electrode does not have large influence on the cover layer although densifying starts from a lower temperature in the effective capacity region because of stress caused by the contraction of the internal electrode (for example, see Japanese Patent Application Publication No. 2006-339285). Therefore, when the lower cover layer has a large thickness for the purpose of suppressing the acoustic noise, a difference of densifying start temperatures between the effective capacity region and the lower cover layer gets larger. In this case, a crack may occur in an interface between the effective capacity region and the cover layer. When proper sintering is achieved in the effective capacity region, sufficient sintering is not achieved in the cover layer and sufficient densifying is not achieved in the cover layer. Accordingly, reliability may be degraded.

The present invention has a purpose of providing a multilayer ceramic capacitor that is capable of suppressing a defect of a case where one of cover layers is thicker than the other and a manufacturing method of the multilayer ceramic capacitor.

According to an aspect of the present invention, there is provided a multilayer ceramic capacitor including: a multilayer structure having a parallelepiped shape in which each of a plurality of dielectric layers and each of a plurality of internal electrode layers are alternately stacked and are alternately exposed to two edge faces of the multilayer structure, a main component of the plurality of dielectric layers being a ceramic; and a first cover layer and a second cover layer that sandwich the multilayer structure in a stacking direction of the multilayer structure, a main component of the first cover layer and the second cover layer being the same as that of the dielectric layers, wherein the first cover layer is thicker than the second cover layer, wherein a concentration of Mn of at least a part of the first cover layer is higher than a concentration of Mn of the dielectric layers in an effective capacity region in which a set of internal electrode layers exposed to a first edge face of the multilayer structure face with another set of internal electrode layers exposed to a second edge face of the multilayer structure.

According to another aspect of the present invention, there is provided a manufacturing method of a multilayer ceramic capacitor including: a first step of forming a multilayer unit by providing a pattern of metal conductive paste on a green sheet including main component ceramic particles; a second step of forming a multilayer ceramic structure by stacking a plurality of multilayer units obtained in the first step so that a position of the pattern is alternately shifted; a third step of providing a first cover sheet and a second cover sheet so as to sandwich the ceramic multilayer structure in a stacking direction, the first cover sheet and the second cover sheet including main component ceramic particles; and a fourth step of firing the multilayer ceramic structure, wherein the first cover sheet is thicker than the second cover sheet, wherein a concentration of Mn of at least a part of the first cover sheet with respect to the main component ceramic is higher than a concentration of Mn of the green sheet with respect to the main component ceramic.

DETAILED DESCRIPTION

A description will be given of an embodiment with reference to the accompanying drawings.

Embodiment

Figure 1:
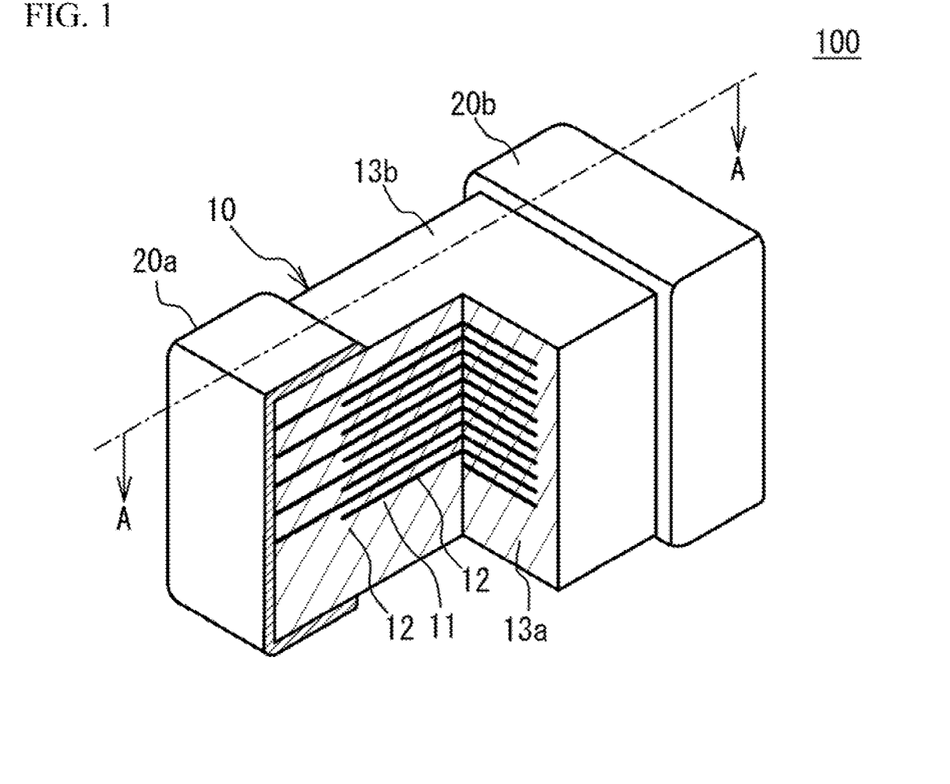
FIG. 1 illustrates a partial perspective view of a multilayer ceramic capacitor.
Figure 2:
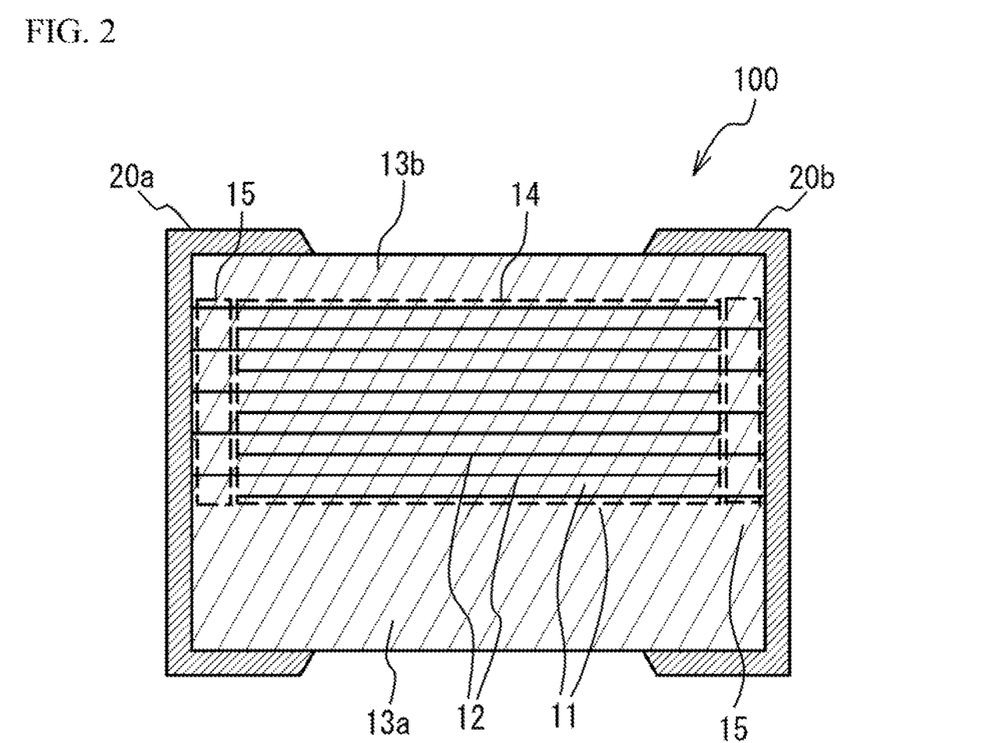
FIG. 2 illustrates a cross section taken along a line A-A of FIG. 1.

FIG. 1 illustrates a partial perspective view of a multilayer ceramic capacitor 100 in accordance with an embodiment. FIG. 2 illustrates a cross sectional view taken along a line A-A of FIG. 1. As illustrated in FIG. 1 and FIG. 2, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first edge face of the multilayer chip 10 and a second edge face of the multilayer chip 10 that is different from the first edge face. In the embodiment, the first edge face with the second edge face. The external electrode 20a is provided on the first edge face. The external electrode 20b is provided on the second edge face. Thus, the internal electrode layers 12 are alternately conducted to the external electrode 20a and the external electrode 20b.

In the multilayer structure of the dielectric layers 11 and the internal electrode layers 12, two of the internal electrode layers 12 are respectively stacked on outermost layers in the stacking direction. A first cover layer 13a covers a lower face of the multilayer structure. A second cover layer 13b covers an upper face of the multilayer structure. Therefore, the first cover layer 13a and the second cover layer 13b sandwich the multilayer structure in the stacking direction. A main component of the first cover layer 13a and the second cover layer 13b is a ceramic material. For example, a main component of the first cover layer 13a and the second cover layer 13b is the same as that of the dielectric layer 11.

For example, the multilayer ceramic capacitor 100 may have a length of 1.0 mm, a width of 0.5 mm and a height of 0.5 mm. The multilayer ceramic capacitor 100 may have a length of 1.0 mm, a width of 0.5 mm and a height of 0.7 mm. The multilayer ceramic capacitor 100 may have a length of 1.0 mm, a width of 0.5 mm and a height of 0.9 mm. The multilayer ceramic capacitor 100 may have a length of 1.6 mm, a width of 0.8 mm and a height of 0.8 mm. The multilayer ceramic capacitor 100 may have a length of 1.6 mm, a width of 0.8 mm and a height of 1.0 mm. The multilayer ceramic capacitor 100 may have a length of 1.6 mm, a width of 0.8 mm and a height of 1.2 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0<x<1$, $0<y<1$, $0<z<1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as an effective capacity region 14. That is, the effective capacity region 14 is a region in which the internal electrode layers 12 next to each other are connected to different external electrodes and face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

Figure 3:
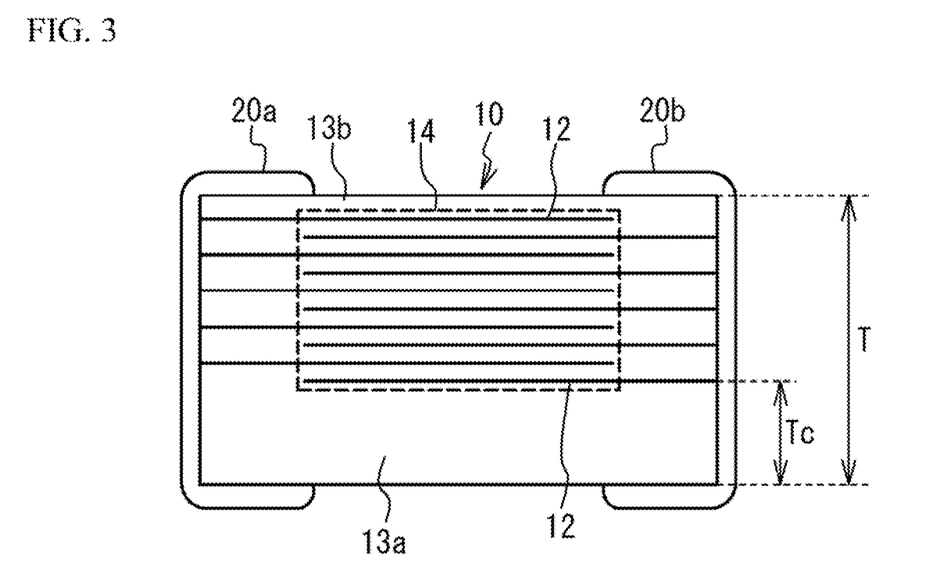
FIG. 3 illustrates a thickness of a first cover layer.

The first cover layer 13a is thicker than the second cover layer 13b. In the structure, it is possible to suppress acoustic noise, when a mount face of the multilayer ceramic capacitor 100 is the first cover layer 13a in a case where the multilayer ceramic capacitor 100 is mounted on a circuit substrate or the like. It is preferable that the first cover layer 13a is thick, from a viewpoint of suppression of the acoustic noise. For example, when a thickness of the multilayer chip 10 in the stacking direction is T and a thickness of the first cover layer 13a is Tc as illustrated in FIG. 3, it is preferable that Tc/T is 0.2 or more. It is more preferable that Tc/T is 0.3 or more. It is preferable that Tc is 50 μm or more. It is more preferable that Tc is 100 μm or more. On the other hand, it is possible to suppress size enlargement of the multilayer ceramic capacitor 100, because the second cover layer 13b is thinner than the first cover layer 13a.

Figure 4:
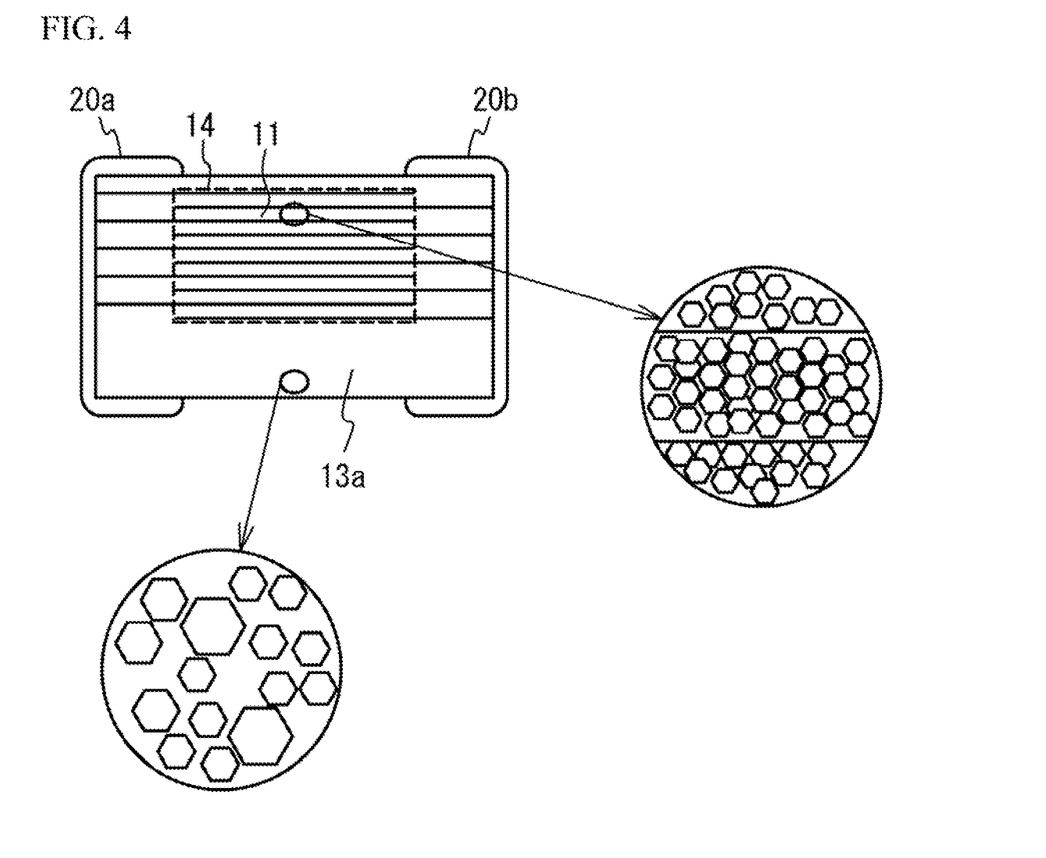
FIG. 4 illustrates densifying caused by sintering.

A description will be given of an example of a manufacturing method of the multilayer chip 10. For example, it is possible to form the dielectric layers 11, the first cover layer 13a and the second cover layer 13b by firing ceramic powders and densifying the ceramic powders. It is possible to form the internal electrode layers 12 by firing metal powders and densifying the metal powders. The densifying of the ceramic powders starts from a low temperature in a region corresponding to the effective capacity region 14, because of stress caused by contraction of the metal powders. On the other hand, the densifying start temperature of the ceramic powders gets higher in regions corresponding to the first cover layer 13a and the second cover layer 13b, because the stress caused by the contraction of the metal powders hardly influences on the regions. The densifying start temperature of the ceramic powders specifically gets higher in the region corresponding to the first cover layer 13a of which the thickness is large. Thus, a difference between the densifying start temperatures gets larger. Therefore, a crack tends to occur in an interface between the effective capacity region 14 and the first cover layer 13a. As illustrated in FIG. 4, when proper sintering is achieved in the effective capacity region 14, the sintering of the first cover layer 13a is not sufficient and the densifying is not sufficient. Therefore, the reliability of the multilayer ceramic capacitor 100 may be degraded. Accordingly, although it is possible to suppress the acoustic noise by enlarging the thickness of the first cover layer 13a, a defect may occur in the multilayer ceramic capacitor 100.

And so, in the embodiment, a concentration of Mn (manganese) in at least a part of the first cover layer 13a is higher than a concentration of Mn in the dielectric layer 11 in the effective capacity region 14. Mn promotes the densifying of the ceramic powders in the firing process and lowers the densifying start temperature. The densifying start temperature of the ceramic powders in the region corresponding to the first cover layer 13a is reduced and the difference of the densifying start temperatures between the region corresponding to the effective capacity region 14 and the region corresponding to the first cover layer 13a is reduced, when the concentration of Mn in the first cover layer 13a is enlarged. It is therefore possible to suppress the occurrence of the crack at in the interface between the effective capacity region 14 and the first cover layer 13a. It is possible to suppress the degradation of the reliability of the multilayer ceramic capacitor 100, because the densifying of the first cover layer 13a is promoted. Accordingly, it is possible to suppress the defect of a case where one of the cover layers is thicker than the other.

It is possible to reduce the densifying start temperature by adding a glass component or the like to the first cover layer 13a. However, in this case, the glass component may cause grain growth. Therefore, when the glass component is used, it is difficult to suppress the grain growth and reduce the densifying start temperature. On the other hand, Mn has a function of suppressing the grain growth. Therefore, in the embodiment, it is possible to suppress the grain growth of the first cover layer 13a and reduce the densifying start temperature.

When the concentration of Mn of the first cover layer 13a is excessively small, the densifying of the first cover layer 13a may not be necessarily and sufficiently promoted. And so, it is preferable that the concentration of Mn of the first cover layer 13a has a lower limit. For example, it is preferable that the concentration of Mn of the first cover layer 13a is twice or more of the concentration of Mn of the dielectric layer 11 in the effective capacity region 14. It is more preferable that the concentration of Mn of the first cover layer 13a is 5 times or more of the concentration of Mn of the dielectric layer 11 in the effective capacity region 14. On the other hand, when the concentration of Mn of the first cover layer 13a is excessively high, the densifying start temperature may be reduced and a defect such as the crack caused by a gap between the densifying start temperatures between the effective capacity region 14 and the first cover layer 13a may occur. And so, it is preferable that the concentration of Mn of the first cover layer 13a has an upper limit. For example, it is preferable that the concentration of Mn of the first cover layer 13a is 30 times or less of the concentration of Mn of the dielectric layer 11 in the effective capacity region 14. It is more preferable that the concentration of Mn of the first cover layer 13a is 15 times or less of the concentration of Mn of the dielectric layer 11 in the effective capacity region 14.

Figure 5:
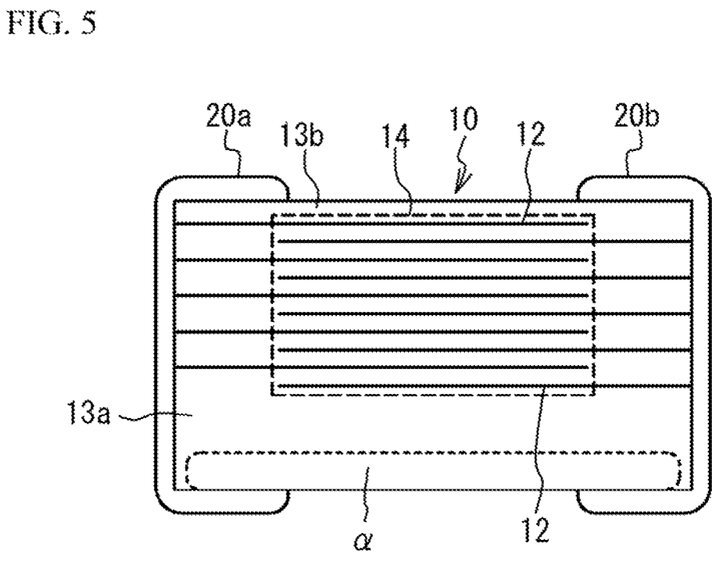
FIG. 5 illustrates a region in which a concentration of Mn is high.

A part of the first cover layer 13a far from the effective capacity region 14 is not subjected to influence of stress caused by contraction of metal powders. Therefore, the densifying start temperature of the part may be specifically high. And so, as illustrated in FIG. 5, it is preferable that a concentration of Mn in a region a of the first cover layer 13a spaced from the effective capacity region 14 by 50 μm or more is higher than that of the dielectric layer 11 in the effective capacity region 14. It is preferable that the concentration of Mn in the region a is twice or more and 30 times or less of the concentration of Mn of the dielectric layer 11 in the effective capacity region 14. It is more preferable that the concentration of Mn in the region a is 5 times or more and 15 times or less of the concentration of Mn of the dielectric layer 11 in the effective capacity region 14.

Figure 6:
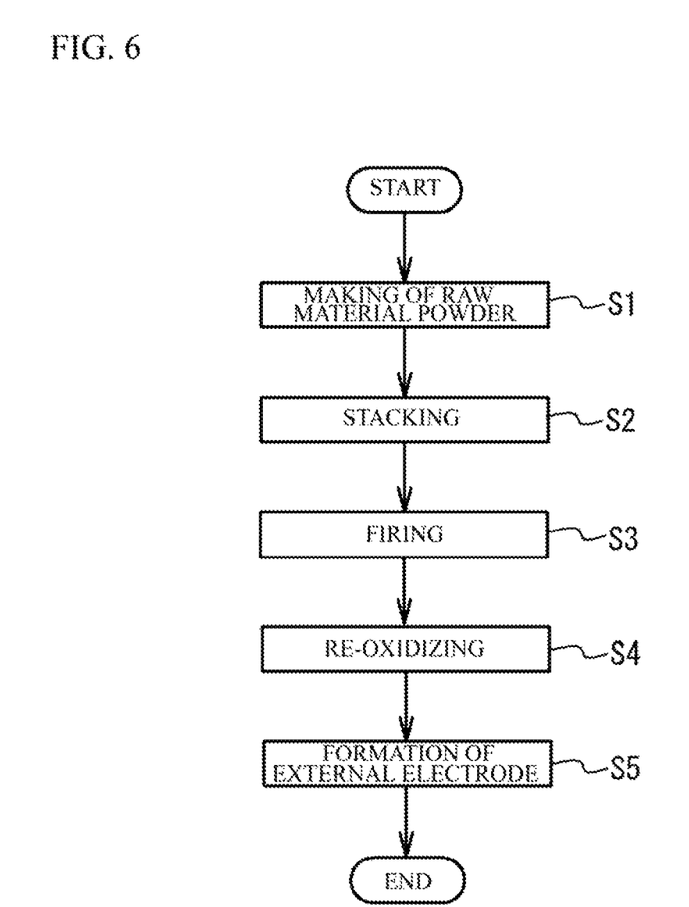
FIG. 6 illustrates a manufacturing method of the multilayer ceramic capacitor.

Next, a description will be given of a manufacturing method of the multilayer ceramic capacitor 100. FIG. 6 illustrates a manufacturing method of the multilayer ceramic capacitor 100.

(Making Process of Raw Material Powder)

Ceramic powder for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used.

Additive compound may be added to the resulting ceramic powder in accordance with purposes. The additive compound may be an oxide of Mg (magnesium), Mn, V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon), or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives and are dried and crushed. Thus, ceramic powder is obtained. For example, it is preferable that an average grain diameter of the resulting ceramic powders is 50 nm to 300 nm from a viewpoint of thickness reduction of the dielectric layer 11. For example, the grain diameter may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting ceramic powder and wet-blended. With use of the resulting slurry, a stripe-shaped dielectric green sheet with a thickness of 3 μm to 10 μm is coated on a base material by, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BatiO_3$ of which an average grain diameter is 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations.

A first cover sheet to be the first cover layer 13a and a second cover sheet to be the second cover layer 13b are crimped so as to sandwich the resulting ceramic multilayer structure in the stacking direction. The resulting structure is cut into a predetermined size (for example, 1.0 mm×0.5 mm). In the embodiment, an added amount of Mn is adjusted so that the concentration of Mn of at least a part of the first cover sheet with respect to the main component ceramic is higher than that of the dielectric green sheet of the ceramic multilayer structure with respect to the main component ceramic. For example, the added amount of Mn may be adjusted so that the concentration of Mn of a region of the first cover sheet spaced from the ceramic multilayer structure by 50 µm or more with respect to the main component ceramic is higher than that of the dielectric green sheet of the ceramic multilayer structure with respect to the main component ceramic.

And, the thickness of the first cover sheet is larger than the thickness of the second cover sheet. When the first cover sheet and the second cover sheet are formed by stacking a plurality of dielectric green sheets, the number of the stacked dielectric green sheets in the first cover sheet is larger than the number of the stacked dielectric green sheets in the second cover sheet. When the concentration of Mn of the first cover sheet has distribution, the added amount of Mn may be enlarged in a part of the dielectric green sheet in the region of which the concentration of Mn is high.

The binder is removed from the resulting compact in $N_2$ atmosphere. After that, metal paste to be the base layers of the external electrodes 20a and 20b is coated from both edge faces of the compact to the side faces and is dried. The metal paste includes metal filler including a main component metal of the external electrodes 20a and 20b, a co-material, a binder, a solvent and so on.

(Firing Process)

The binder is removed from the resulting compact in $N_2$ atmosphere of a temperature range of 250 degrees C. to 500 degrees C. After that, the resulting compact is fired for ten minutes to 2 hours in a reductive atmosphere of which an oxygen partial pressure is $10^{-5}$ to $10^{-8}$ atm in a temperature range of 1100 degrees C. to 1300 degrees C. Thus, each compound is sintered and grown into grains.

(Re-Oxidizing Process)

After that, a re-oxidizing process may be performed in $N_2$ gas atmosphere in a temperature range of 600 degrees C. to 1000 degrees C.

(Forming Process of External Electrode)

After that, with a plating process, Cu, Ni, Sn and so on may be coated on a base layer of the external electrodes 20a and 20b. Thus, the multilayer ceramic capacitor 100 is manufactured.

In the manufacturing method of the embodiment, the concentration of Mn of at least a part of the first cover sheet with respect to the main component ceramic is higher than that of the dielectric green sheet in the ceramic multilayer structure with respect to the main component ceramic. In this case, the densifying start temperature of the ceramic powder in the first cover sheet is reduced, and the difference of the densifying start temperatures between the ceramic multilayer structure and the first cover sheet is reduced. It is therefore possible to suppress the occurrence of the crack in the interface between the effective capacity region 14 and the first cover layer 13a in the multilayer ceramic capacitor 100. And it is possible to suppress the degradation of the reliability of the multilayer ceramic capacitor 100 because the densifying of the first cover layer 13a is promoted. And it is possible to suppress the acoustic noise because the first cover layer 13a is thicker than the second cover layer 13b. Accordingly, it is possible to suppress the defect of the case where one of cover layers is thicker than the other.

EXAMPLES

The multilayer ceramic capacitors in accordance with the embodiment were made. And, property of the multilayer ceramic capacitors was measured.

Comparative Example 1 and Examples 1 to 4

Ceramic powder of $BaTiO_3$ was prepared. Additives and sintering assistants were added to the ceramic powder. The resulting ceramic powder was sufficiently wet-blended and crushed with a ball mil. Thus, the dielectric material was obtained. An organic binder and a solvent were added to the dielectric material. And dielectric green sheets were made by a doctor blade method. A thickness of the dielectric green sheet was 0.8 µm. The organic binder was polyvinyl butyral (PVB) resin or the like. The solvent was ethanol, toluene or the like. And a plasticizer and so on were added. Next, the conductive paste for forming the internal electrode layer was formed by a planetary boll mill. The conductive paste included a main component metal (Ni) powder of the internal electrode layer 12, a co-material (barium titanate), a binder (ethyl cellulose), a solvent and an auxiliary as needed.

The conductive paste for forming the internal electrode layer was screen-printed on the dielectric green sheet. 250 of the dielectric green sheets on which the conductive paste for forming the internal electrode layer was printed were stacked, and a first cover sheet was stacked on the stacked dielectric green sheets. A second cover sheet was stacked under the stacked dielectric green sheets. The first cover sheet and the second cover sheet were formed by stacking a plurality of dielectric green sheets. The thicknesses of the first cover sheet and the second cover sheet were adjusted by adjusting the number of the stacked dielectric green sheets.

After that, a ceramic multilayer structure was obtained by a thermocompression bonding. And the ceramic multilayer structure was cut into a predetermined size. The binder was removed from the ceramic multilayer structure in $N_2$ atmosphere. After that, the metal paste to be the base layers of the external electrodes 20a and 20b including the metal filler of which a main component was Ni, the co-material, the binder and the solvent was coated from the both edge faces to the side faces of the ceramic multilayer structure and was dried. After that, the resulting multilayer structure was fired together with the metal paste for 10 minutes to 2 hours in a reductive atmosphere in a temperature range of 1100 degrees C. to 1300 degrees C. And, a sintered structure was formed.

The resulting sintered structure had a length of 1.0 mm and a width of 0.5 mm. The sintered structure was subjected to a re-oxidation process at 800 degrees C. in $N_2$ atmosphere. After that, by a plating process, a Cu-plated layer, a Ni-plated layer and a Sn-plated layer were formed on a surface of a base layer of the external electrodes 20a and 20b. And, the multilayer ceramic capacitor 100 was obtained.

As shown in Table 1, in the comparative example 1, the thickness T of the multilayer chip 10 in the stacking direction was 500 µm. The thickness T in the example 1 was 590 µm. The thickness T in the example 2 was 685 µm. The thickness T in the example 3 was 795 µm. The thickness T in the example 4 was 950 µm. In the comparative example 1, the thickness Tc of the first cover layer 13a was 25 µm. The thickness Tc in the example 1 was 115 µm. The thickness Tc in the example 2 was 210 µm. The thickness Tc in the example 3 was 320 μm. The thickness Tc in the example 4 was 475 μm. Therefore, Tc/T was 0.05 in the comparative example 1. Tc/T was 0.19 in the example 1. Tc/T was 0.31 in the example 2. Tc/T was 0.40 in the example 3. Tc/T was 0.50 in the example 4. In any one of the comparative example 1 and the examples 1 to 4, the thickness of the second cover layer 13b was 25 μm, and the thickness of the effective capacity region 14 was 450 μm. The structure of the comparative example 1 regulated by these thicknesses is referred to as a structure 1. The structure of the example 1 regulated by these thicknesses is referred to as a structure 2. The structure of the example 2 regulated by these thicknesses is referred to as a structure 3. The structure of the example 3 regulated by these thicknesses is referred to as a structure 4. The structure of the example 4 regulated by these thicknesses is referred to as a structure 5.

TABLE 1

| | STRUCTURE No. | Tc (μm) | T (μm) | 2nd COVER (μm) | EFFECTIVE CAPACITY REGION (μm) | Tc/T | SOUND PRESSURE (dB) |
|---|---|---|---|---|---|---|---|
| COMPARATIVE EXAMPLE 1 | 1 | 25 | 500 | 25 | 450 | 0.05 | 30 |
| EXAMPLE 1 | 2 | 115 | 590 | 25 | 450 | 0.19 | 24 |
| EXMAPLE 2 | 3 | 210 | 685 | 25 | 450 | 0.31 | 20 |
| EXAMPLE 3 | 4 | 320 | 795 | 25 | 450 | 0.40 | 18 |
| EXAMPLE 4 | 5 | 475 | 950 | 25 | 450 | 0.50 | 16 |

10 samples were subjected to a sound pressure test, with respect to each of the comparative example 1 and the examples 1 to 4. In the sound pressure test, each sample was mounted on a substrates so that the first cover layer 13a was on the substrate side. An alternating voltage of 5V was applied to the external electrodes 20a and 20b, and a frequency of the alternating voltage was increased from 0 MHz to 1 MHz. A sound pressure in an audible range (dB) generated during the applying of the voltage was measured by TYPe-3560-B130 made by BRUEL KJAER JAPAN in a sound-insulation and anechoic room made by YOKOHAMA SOUND ENVIRONMENT SYSTEMS. The measured sound pressure was an average of 10 measured results. As shown in Table 1, the sound pressure was a high value of 30 dB, in the comparative example 1. It is thought that this was because the thickness Tc of the first cover layer 13a was the same as that of the second cover layer 13b, and the first cover layer 13a was not thick. On the other hand, in the examples 1 to 4, the sound pressure was a low value of less than 30 dB. It is thought that this was because the thickness Tc was larger than the thickness of the second cover layer 13b, and the first cover layer 13a was thick. In particular, in the examples 2 to 4, the sound pressure was a much lower value that was equal to or less than 20 dB. It is thought that this was because Tc/T was 0.20 or more and the first cover layer 13a was sufficiently thick.

Comparative Examples 2 and 3 and Examples 5 to 10

In a comparative example 2, Mn was not added to the first cover layer 13a, in each of the structures 2 to 5. That is, in the comparative example 2, in each of the structures 2 to 5, the concentration of Mn of the first cover layer 13a was 0 times as that of the effective capacity region 14. In the comparative examples 3, in each of the structures 2 to 5, the concentration of Mn of the first cover layer 13a was the same as that of the effective capacity region 14. That is, in the comparative example 3, the concentration of Mn of the first cover layer 13a was the same as that of the effective capacity region 14. In the example 5, in each of the structures 2 to 5, the concentration of Mn of the first cover layer 13a was twice as that of the effective capacity region 14. In the example 6, in each of the structures 2 to 5, the concentration of Mn of the first cover layer 13a was 5 times as that of the effective capacity region 14. In the example 7, in each of the structures 2 to 5, the concentration of Mn of the first cover layer 13a was 10 times as that of the effective capacity region 14. In the example 8, in each of the structures 2 to 5, the concentration of Mn of the first cover layer 13a was 15 times as that of the effective capacity region 14. In the example 9, in each of the structures 2 to 5, the concentration of Mn of the first cover layer 13a was 20 times as that of the effective capacity region 14. In the example 10, in each of the structures 2 to 5, the concentration of Mn of the first cover layer 13a was 30 times as that of the effective capacity region 14. The ratio of the concentration of Mn of the first cover layer 13a and the concentration of Mn of the effective capacity region 14 was adjusted with use of the added amount of Mn to the first cover sheet.

Figure 7:
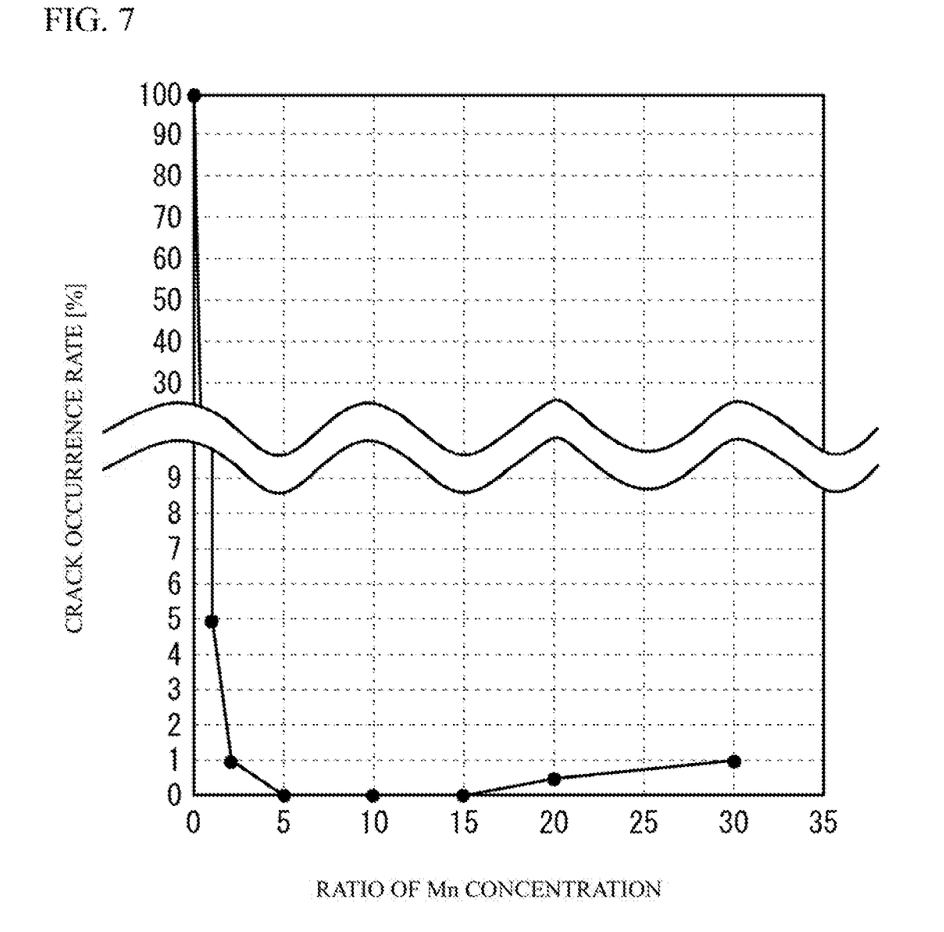
FIG. 7 illustrates results of examples and a comparative example.

1000 samples were made with respect to each of the comparative examples 2 and 3 and the examples 5 to 10. And a crack occurrence rate in the interface between the first cover layer 13a and the effective capacity region 14 was measured. Table 2 shows the results. FIG. 7 illustrates the results of the structure 3. As shown in Table 2 and FIG. 7, with respect to the structure 3, the crack occurrence rate was 100% in the comparative example 2. It is thought that this was because the difference of the densifying start temperatures between the first cover layer 13a and the effective capacity region 14 was large because Mn was not added to the first cover sheet and the concentration of Mn of the first cover layer 13a was zero times as that of the effective capacity region 14. In the comparative example 3, the crack occurrence rate was not 100% but a large value of 5%. It is thought that this was because the difference of the densifying start temperatures between the first cover layer 13a and the effective capacity region 14 was not sufficiently reduced because the concentration of Mn of the first cover layer 13a was equal to that of the effective capacity region 14.

TABLE 2

| | Mn CONCENTRATION RATIO | CRACK OCCURRENCE RATE (%) | | | |
|---|---|---|---|---|---|
| | | STRUCTURE 2 | STRUCTURE 3 | STRUCTURE 4 | STRUCTURE 5 |
| COMPARATIVE EXAMPLE 2 | 0 | 100 | 100 | 100 | 100 |
| COMPARATIVE EXMAPLE 3 | 1 | 3 | 5 | 8 | 10 |
| EXAMPLE 5 | 2 | 0.5 | 1 | 1.7 | 2.2 |
| EXAMPLE 6 | 5 | 0 | 0 | 0.2 | 0.5 |
| EXAMPLE 7 | 10 | 0 | 0 | 0 | 0 |
| EXAMPLE 8 | 15 | 0 | 0 | 0 | 0 |
| EXAMPLE 9 | 20 | 0.2 | 0.5 | 0.6 | 0.8 |
| EXAMPLE 10 | 30 | 0.5 | 1 | 1.5 | 2 |

On the other hand, in the examples 5 to 10, the crack occurrence rate was a low value of 1% or less. It is thought that this was because the concentration of Mn of the first cover layer 13a was higher than that of the effective capacity region 14 and the difference of the densifying start temperatures between the first cover layer 13a and the effective capacity region 14 was sufficiently small. In particular, in the examples 6 to 9, the crack occurrence rate was further reduced. It is thought that this was because the concentration of Mn of the first cover layer 13a was 5 times to 20 times of that of the effective capacity region 14 and the difference of the densifying start temperatures between the first cover layer 13a and the effective capacity region 14 was sufficiently reduced.

Figure 8:
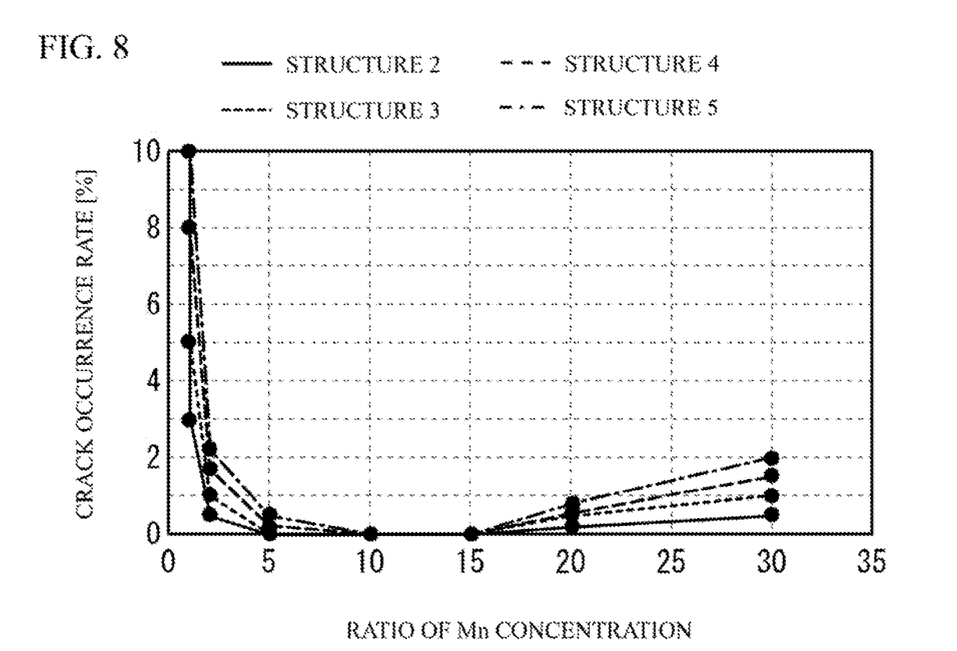
FIG. 8 illustrates results of examples and comparative examples.

As illustrated in Table 2 and FIG. 8, similar results were also observed in the structures 2, 4 and 5. That is, the crack occurrence rate was lowered when the concentration of Mn of the first cover layer 13a was higher than that of the dielectric layer 11 in the effective capacity region 14. And, the crack occurrence rate was further lowered when the concentration of Mn of the first cover layer 13a was 5 times to 20 times as that of the effective capacity region 14.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure having a parallelepiped shape in which each of a plurality of dielectric layers and each of a plurality of internal electrode layers are alternately stacked and are alternately exposed to two edge faces of the multilayer structure, a main component of the plurality of dielectric layers being a ceramic; and
   a first cover layer and a second cover layer that sandwich the multilayer structure in a stacking direction of the multilayer structure, a main component of the first cover layer and the second cover layer being the same as that of the dielectric layers,
   wherein the first cover layer is thicker than the second cover layer, and a thickness of the first cover layer is more than 50 μm,
   wherein a concentration of Mn of a part of the first cover layer is higher than a concentration of Mn of the dielectric layers in an effective capacity region in which a set of internal electrode layers exposed to a first edge face of the multilayer structure face with another set of internal electrode layers exposed to a second edge face of the multilayer structure, wherein the part of the first cover layer is only a region of the first cover layer spaced from the multilayer structure by at least 50 μm, wherein the concentration of Mn in the region of the first cover layer is twice or more and 30 times or less of the concentration of Mn of the dielectric layers in the effective capacity region.

2. The multilayer ceramic capacitor as claimed in claim 1, wherein Tc/T is 0.2 or more when a total thickness of the multilayer structure, the first cover layer and the second cover layer is T, and a thickness of the first cover layer is Tc.

3. A substrate on which the multilayer ceramic capacitor of claim 1 is mounted in a manner that the first cover layer is faces the substrate.

4. The substrate as claimed in claim 3, wherein Tc/T is 0.2 or more when a total thickness of the multilayer structure, the first cover layer and the second cover layer is T, and a thickness of the first cover layer is Tc.

5. The substrate as claimed in claim 3, wherein the concentration of Mn in the region of the first cover layer is more than 20 times and 30 times or less of the concentration of Mn of the dielectric layers in the effective capacity region.

6. The multilayer ceramic capacitor as claimed in claim 1, wherein the concentration of Mn in the region of the first cover layer is more than 20 times and 30 times or less of the concentration of Mn of the dielectric layers in the effective capacity region.

7. A manufacturing method of a multilayer ceramic capacitor comprising:
   a first step of forming a multilayer unit by providing a pattern of metal conductive paste on a green sheet including main component ceramic particles;
   a second step of forming a multilayer ceramic structure by stacking a plurality of multilayer units obtained in the first step so that a position of the pattern is alternately shifted;
   a third step of providing a first cover sheet and a second cover sheet so as to sandwich the multilayer ceramic structure in a stacking direction, the first cover sheet and the second cover sheet including main component ceramic particles; and
   a fourth step of firing the multilayer ceramic structure,
   wherein the first cover sheet is thicker than the second cover sheet, and a thickness of the first cover layer is more than 50 μm,
   wherein a concentration of Mn of a part of the first cover sheet with respect to the main component ceramic is higher than a concentration of Mn of the green sheet with respect to the main component ceramic, wherein the part of the first cover sheet is only a region of the first cover sheet spaced from the multilayer ceramic structure by at least 50 μm, wherein the concentration of Mn in the region of the first cover layer is twice or more and 30 times or less of the concentration of Mn of the dielectric layers in the effective capacity region.

8. The manufacturing method of the multilayer ceramic capacitor as claimed in claim 7, wherein the concentration of Mn in the region of the first cover layer with respect to the main component ceramic is more than 20 times and 30 times or less of the concentration of Mn of the green sheet with respect to the main component ceramic.

9. A multilayer ceramic capacitor comprising:

a multilayer structure having a parallelepiped shape in which each of a plurality of dielectric layers and each of a plurality of internal electrode layers are alternately stacked and are alternately exposed to two edge faces of the multilayer structure, a main component of the plurality of dielectric layers being a ceramic; and a first cover layer and a second cover layer that sandwich the multilayer structure in a stacking direction of the multilayer structure, a main component of the first cover layer and the second cover layer being the same as that of the dielectric layers, wherein the first cover layer is thicker than the second cover layer, wherein a concentration of Mn of at least a part of the first cover layer is more than 20 times but no more than 30 times of a concentration of Mn of the dielectric layers in an effective capacity region in which a set of internal electrode layers exposed to a first edge face of the multilayer structure face with another set of internal electrode layers exposed to a second edge face of the multilayer structure.

* * * * *

UNITED STATES PATENT AND TRADEMARK OFFICE
CERTIFICATE OF CORRECTION

PATENT NO. : 10,943,734 B2
APPLICATION NO. : 16/274065
DATED : March 9, 2021
INVENTOR(S) : Hideya Teraoka et al.

Page 1 of 1

It is certified that error appears in the above-identified patent and that said Letters Patent is hereby corrected as shown below:

In the Claims

At Column 12, Line 30, in Claim 3, the word "is" between "layer" and "faces" should be deleted.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*